United States Patent [19]

Furuya et al.

[11] Patent Number: 4,644,544
[45] Date of Patent: Feb. 17, 1987

[54] APPARATUS FOR CORRECTING ERRORS

[75] Inventors: Tsuneo Furuya; Katsuya Hori, both of Kawasaki, Japan

[73] Assignee: Sony Corporation, Tokyo, Japan

[21] Appl. No.: 672,267

[22] PCT Filed: Mar. 12, 1984

[86] PCT No.: PCT/JP84/00099

§ 371 Date: Nov. 7, 1984

§ 102(e) Date: Nov. 7, 1984

[87] PCT Pub. No.: WO84/03808

PCT Pub. Date: Sep. 27, 1984

[30] Foreign Application Priority Data

Mar. 12, 1983 [JP] Japan .................................. 58-40959
Mar. 19, 1983 [JP] Japan .................................. 58-46796

[51] Int. Cl.$^4$ .............................................. G06F 11/00
[52] U.S. Cl. ........................................ 371/37; 371/38; 371/39; 371/40
[58] Field of Search ......................... 371/37, 38, 39, 40

[56] References Cited

U.S. PATENT DOCUMENTS 3,988,677 10/1976 Fletcher ................................ 371/40
4,276,646 6/1981 Haggard ............................... 371/37
4,317,201 2/1982 Sedalis .................................. 371/38
4,497,058 1/1985 Sako ..................................... 371/39

FOREIGN PATENT DOCUMENTS 111349 9/1981 Japan ..................................... 371/37
2060227 4/1981 United Kingdom .................. 371/37

Primary Examiner—Jerry Smith
Assistant Examiner—Robert W. Beausoliel, Jr.
Attorney, Agent, or Firm—Lewis H. Eslinger

[57] ABSTRACT

There is provided an apparatus for correcting errors in data which has, as a unit, (n+k+m+l) symbols subjected to the processing for the error correction coding when data consisting of different kinds of n symbols and m symbols is transmitted as a unit. This error correcting apparatus comprises: a first decoder to which (n+k) symbols are supplied and which generates a first flag signal indicative of the error state by at least performing the error detection; and a second decoder to which the (n+k) symbols corrected by the first decoder and the (m+l) symbols received are supplied and which generates a second flag signal representing the error state by performing the error detection and performs the error correction using the first and second flag signals.

5 Claims, 25 Drawing Figures

Fig. 4

(ZERO MODE)

| SYMBOL | R | S | T | U | V | W |
|---|---|---|---|---|---|---|
| 0 | MODE | | | ITEM | | |
| 1 | 0 | 0 | 0 | 0 | 0 | 0 |
| 2 | | | | | | |
| ⋮ | | | | | | |
| 23 | | | | | | |
| 24 | 0 | 0 | 0 | 0 | 0 | 0 |

(GRAPHIC MODE)

| SYMBOL | R | S | T | U | V | W |
|---|---|---|---|---|---|---|
| 0 | MODE | | | ITEM | | |
| 1 | INSTRUCTION | | | | | |
| 2 | PARITY | | | | | |
| 3 | PARITY | | | | | |
| 4 | | | | | | |
| ⋮ | | | DATA | | | |
| 19 | | | | | | |
| 20 | PARITY | | | | | |
| 21 | PARITY | | | | | |
| 22 | PARITY | | | | | |
| 23 | PARITY | | | | | |

Fig. 6

| R | G | B | COLOR |
|---|---|---|---------|
| 0 | 0 | 0 | BLACK |
| 0 | 0 | 1 | BLUE |
| 0 | 1 | 0 | GREEN |
| 0 | 1 | 1 | CYAN |
| 1 | 0 | 0 | RED |
| 1 | 0 | 1 | MAGENTA |
| 1 | 1 | 0 | YELLOW |
| 1 | 1 | 1 | WHITE |

Fig. 7A

| Symbol | R | S | T | U | V | W |
|--------|---|---|---|---|---|---|
| 4 | COLOR | | | 0 | 0 | 0 |
| 5 | 0 | 0 | 0 | 0 | 0 | 0 |
| ⋮ | | | | | | |
| 19 | 0 | 0 | 0 | 0 | 0 | 0 |

Fig. 7B

| Symbol | R | S | T | U | V | W |
|--------|---|---|---|---|---|---|
| 4 | COL | | 0 | COL | | 1 |
| 5 | RL | | 0 | ROW | | C |
| 6 | COLUMN | | | L | | |
| 7 | COLUMN | | | C | | |
| 8 | y | | | | | |
| ⋮ | FONT DATA | | | | | |
| 19 | | | | | | z |

Fig. 8

$$Hp = \begin{bmatrix} 1 & 1 & 1 & \cdots & 1 & 1 \\ a^{23} & a^{22} & a^{21} & \cdots & a^1 & 1 \\ a^{46} & a^{44} & a^{42} & \cdots & a^2 & 1 \\ a^{69} & a^{66} & a^{63} & \cdots & a^3 & 1 \end{bmatrix}$$

$$Vp = \begin{bmatrix} S_{24n} \\ S_{24n+1} \\ Q_{24n+2} \\ Q_{24n+3} \\ S_{24n+4} \\ S_{24n+5} \\ S_{24n+6} \\ S_{24n+7} \\ S_{24n+8} \\ S_{24n+9} \\ S_{24n+10} \\ S_{24n+11} \\ S_{24n+12} \\ S_{24n+13} \\ S_{24n+14} \\ S_{24n+15} \\ S_{24n+16} \\ S_{24n+17} \\ S_{24n+18} \\ S_{24n+19} \\ P_{24n+20} \\ P_{24n+21} \\ P_{24n+22} \\ P_{24n+23} \end{bmatrix}$$

Fig. 9

$$Hq = \begin{bmatrix} 1 & 1 & 1 & 1 \\ a^3 & a^2 & a^1 & 1 \end{bmatrix}$$

$$Vq = \begin{bmatrix} S_{24n} \\ S_{24n+1} \\ Q_{24n+3} \\ Q_{24n+4} \end{bmatrix}$$

Fig. 18

| CASE | ERROR DETECTION OF Q DECODING | ERROR DETECTION OF P DECODING | ERROR LOCATION OF P DECODING | PROCESSING RESULT AS A PACK |
|---|---|---|---|---|
| 1 | 0 ERROR | 0 ERROR | | OK |
| 2 | 0 ERROR | 1 ERROR | $4 \leq i \leq 23$ | OK |
| 3 | 0 ERROR | 2 ERRORS | $4 \leq i, j \leq 23$ | OK |
| 4 | 0 ERROR | $\geq 3$ ERRORS | | BAD PACK |
| 5 | 1 ERROR | 0 ERROR | | OK |
| 6 | 1 ERROR | 1 ERROR | $4 \leq i \leq 23$ | OK |
| 7 | 1 ERROR | 2 ERRORS | $4 \leq i, j \leq 23$ | OK |
| 8 | 1 ERROR | $\geq 3$ ERRORS | | BAD PACK |
| 9 | $\geq 2$ ERRORS | 0 ERROR | | ILLEGAL PACK |
| 10 | $\geq 2$ ERRORS | 1 ERROR | | ILLEGAL PACK |
| 11 | $\geq 2$ ERRORS | 2 ERRORS | $0 \leq i, j \leq 3$ | OK |
| 12 | $\geq 2$ ERRORS | $\geq 3$ ERRORS | | BAD PACK |

APPARATUS FOR CORRECTING ERRORS

TECHNICAL FIELD

The present invention relates to an apparatus for correcting errors which is applied to the transmission of a digital information signal through a transmission path such as a recording medium, an optical fiber or the like.

BACKGROUND ART

In an optical digital audio disc (called a compact disc), the main channel consisting of a digital audio signal and a subchannel consisting of data for control, display or the like are recorded on spiral signal tracks. The processing for the error correction coding is performed with regard to the main channel and subchannel, respectively. Eight channels called P, Q, R, S, T, U, V, and W are defined in the subchannel. The P- and Q-channels among them are used for the selection of a program when the compact disc is played back. The display data or audio data is inserted in the other six channels of R to W. For example, the data for explaining a composer, performers and the like of music programs recorded in the main channel is recorded in the six channels of R to W.

The data in the subchannel includes control data such as indication of the kind of data actually recorded or instructions to process the data in the subchannel and the like. This control data is needed to indicate the subchannel or to accurately process the audio data, and its significance is higher than the display or audio data. Therefore, it is necessary to prevent errors from being included in the control data upon playback as possible. For instance, if only one bit of the control data becomes an error, the display data will have been erroneously processed as the audio data, so that this may cause a situation such that an abnormal sound is generated from a speaker.

As well as the data in the subchannel of the compact disc, there is a case where the kinds of data which are transmitted are not identical. For example, in a videotex system using a home use television receiver as a display device, there is a case where a control command is used as a special command other than commands representing fundamental elements in order to transmit graphic information through, e.g., existing telephone line network and optical transmission path.

DISCLOSURE OF THE INVENTION

This invention proposes an apparatus for correcting errors whereby in the case where different kinds of data are included in the data which are transmitted through the same transmission path, with respect to the more significant data, the error detection or error correction processing is commonly performed together with the other data, and at the same time the error correction decoding processing is carried out in the case where the peculiar error detection or error correction processing is executed.

BRIEF DESCRIPTION OF THE DRAWINGS

FIGS. 3A, 3B, and 4 are schematic diagrams which are used for explaining a subcoding signal of the compact disc;

FIGS. 5A, 5B, 6, 7A, and 7B are schematic diagrams which are used for explaining the font graphic mode by the subcoding signal;

FIGS. 8 and 9 are diagrams showing a parity check matrix for error correction codes and a reproduced data matrix in one embodiment of the invention;

FIGS. 17A, 17B, and 18 are a flowchart and a table which are used for explaining the error correcting decoder shown in FIG. 16;

BEST MODE FOR CARRYING OUT THE INVENTION

One embodiment of the present invention relates to an apparatus for correcting errors in the data in the subchannel of a compact disc to which the invention was applied.

A data arrangement of the signal recorded on a compact disc will be described with reference to FIGS. 1 and 2.

Figure 1:
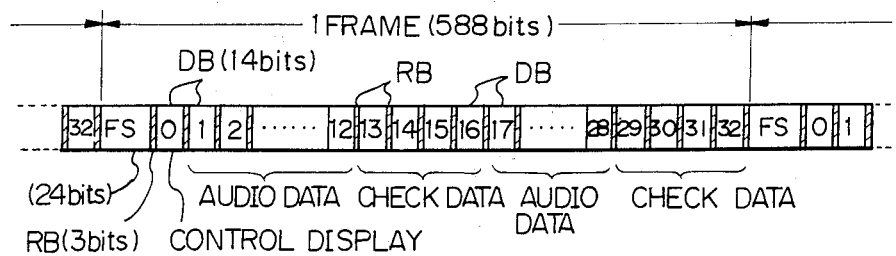
FIGS. 1 and 2 are schematic diagrams which are used for explaining a data arrangement of a compact disc in an embodiment of the present invention.

FIG. 1 shows a data stream recorded on a compact disc. One frame consists of 588 bits of the recording data and a frame sync pulse FS of a particular bit pattern is added to the head of each frame. DC component suppressed bits RB consisting of three bits are provided behind the frame sync pulse FS. Further, thereafter, the 0th to 32nd data bits DBs each of which consists of 14 bits and the 3-bit DC component suppressed bits RB are alternately arranged. The 0th data bits among these data bits DBs are called a subcoding signal or user's bits and are used for controlling the playback of the disc, displaying the relevant information, and the like. The 1st to 12th and the 17th to 28th data bits DBs are allocated for the audio data in the main channel, while the other 13th to 16th and the 29th to 32nd data bits DBs are allocated for the parity data of the error correction codes in the main channel. Each data bits DB are the data of which the 8-bit data was converted to the 14-bit data by the eight-to-fourteen conversion upon recording.

The 98 frames of the above digital signal are called one block and the various kinds of processings are performed on this one-block unit basis.

Figure 2:
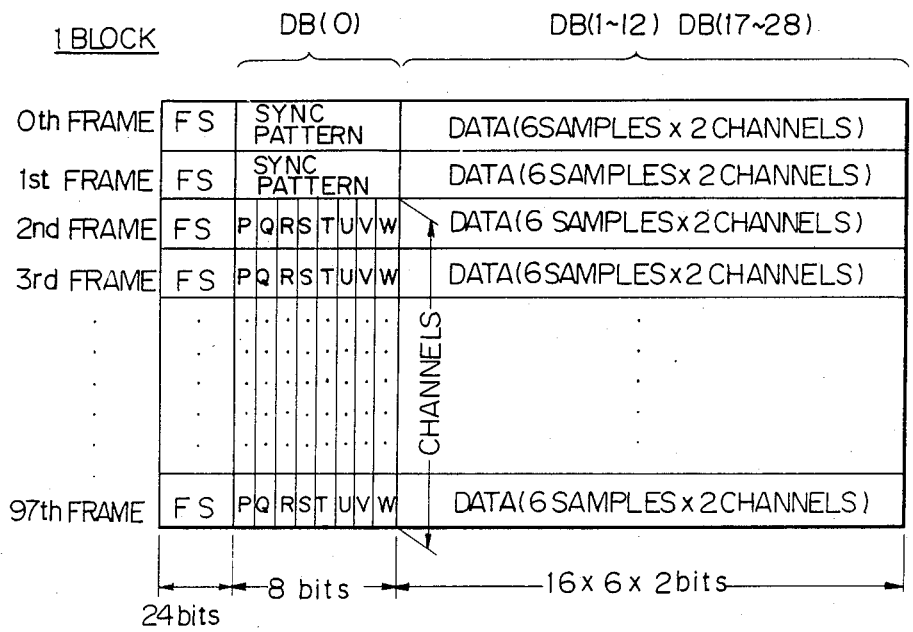

FIG. 2 shows the state in that each data bits DB are set to eight bits exclusive of the DC component suppressed bits and each one block (98 frames) is sequentially arranged in parallel. The subcoding signals P to W in the 0th and first frames form the sync patterns serving as predetermined bit patterns. In addition, with respect to the Q channel, the CRC codes for error detection are inserted in sixteen frames on the final end side among 98 frames.

A P-channel signal may be a flag to indicate a pause and a music program and a signal level is set to low in case of a music program and to high in case of a pause. This signal is a pulse having the period of 2 Hz in the lead-out interval. Therefore, by detecting and counting this P-channel signal, the designated music program can be selected and reproduced. With respect to the Q channel, the same kind of control can be more complicatedly performed. For instance, the information in the Q channel is stored in a microcomputer provided in a disc playback apparatus and it is possible to perform the random selection such that even when a music program is being reproduced, the operation is immediately shifted to the playback of another music program. The other R to W channels are used to display versifiers, composers, explanation, text, and the like of the music programs recorded on the disc, or to explain them by a voice.

Figure 3A:
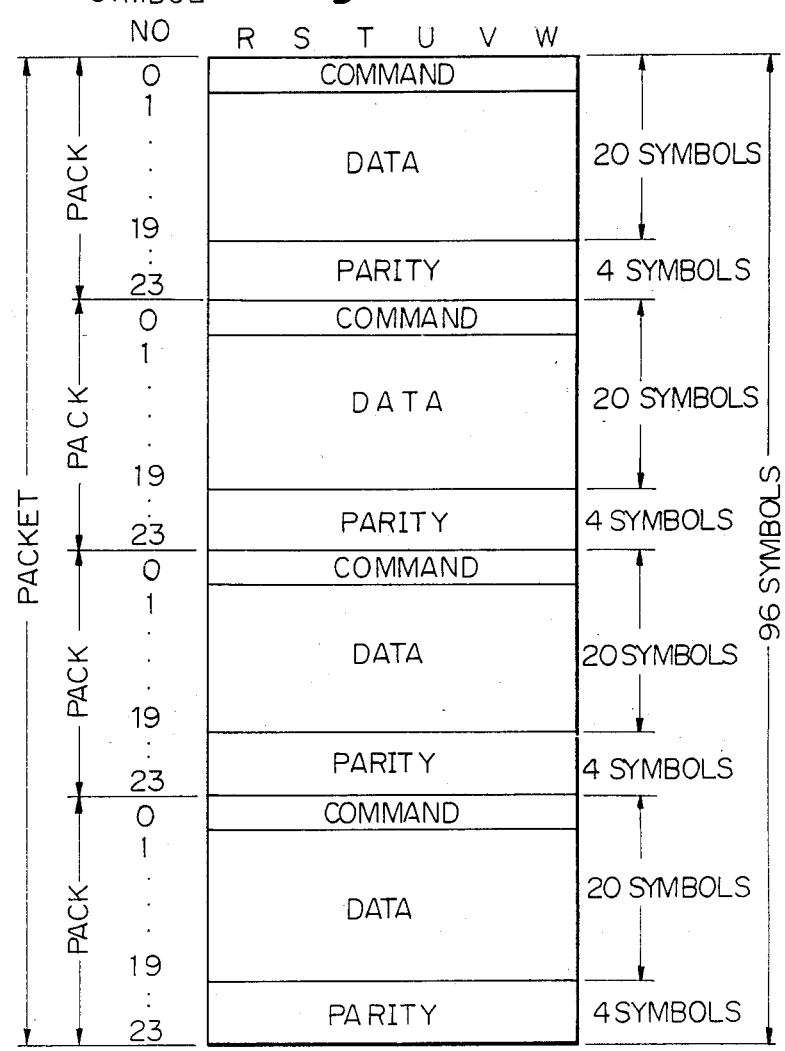
Figure 3B:
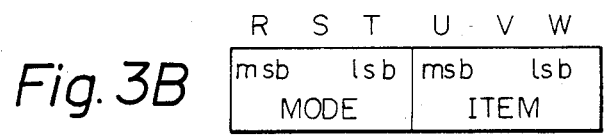

In addition, one packet consists of the data of 96 frames excluding the sync patterns and the P and Q channels in this one block. As shown in FIG. 3A, this packet of (6×96) bits is further divided into four packs each of which consists of 24 symbols. The first symbol in each pack is a command and the subsequent 19 symbols are data and the remaining four symbols are parities for the error correction codes in each pack. As shown in FIG. 3B, this command is constituted by six bits consisting of three bits for mode and three bits for item.

The information represented by three bits for the mode is defined as follows.
(0 0 0): Zero mode
(0 0 1): Graphic mode
(0 1 0): Still picture mode
(0 1 1): Sound mode.

Three bits for the item indicate the information of the more detailed operating mode for each of the above-mentioned operating modes. The zero mode corresponds to the case where no information is recorded with respect to the R to W channels of the subcoding signal. Namely, in this zero mode, as shown in FIG. 4, all bits in the pack including six bits for the mode and item are set to 0.

On the other hand, in the graphic mode whereby three bits for the mode are (0 0 1), the data of each pack is arranged as shown in FIG. 4. In this graphic mode, three bits for the item are set to (0 0 1) in case of displaying the graphic of the font such as characters, sentences or the like, while three bits for the item are set to (0 1 0) in case of the full graphic whereby the data in the whole display region of the display device is controlled. The second symbol in each pack in this graphic mode is used as an instruction. This instruction gives a command for control which is needed in the operating mode specified by a command consisting of the mode and item.

With respect to two symbols for the command and instruction in this graphic mode, an error correction coding processing is performed and the resulting parities of two symbols are added. In addition, sixteen symbols in the pack are used as the data region. With regard to total twenty symbols in the pack, another error correction coding processing is carried out and the resulting parities of four symbols are added.

In the case where predetermined command and instruction are used even in the still picture mode or sound mode, the error correction coding processing is executed similarly to the above.

Figure 5A:
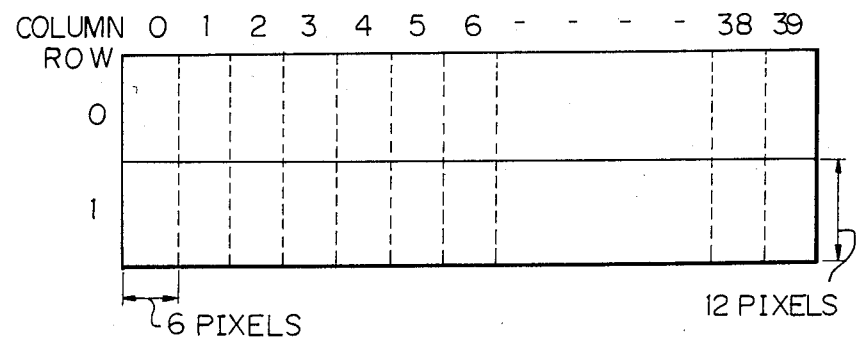
Figure 5B:
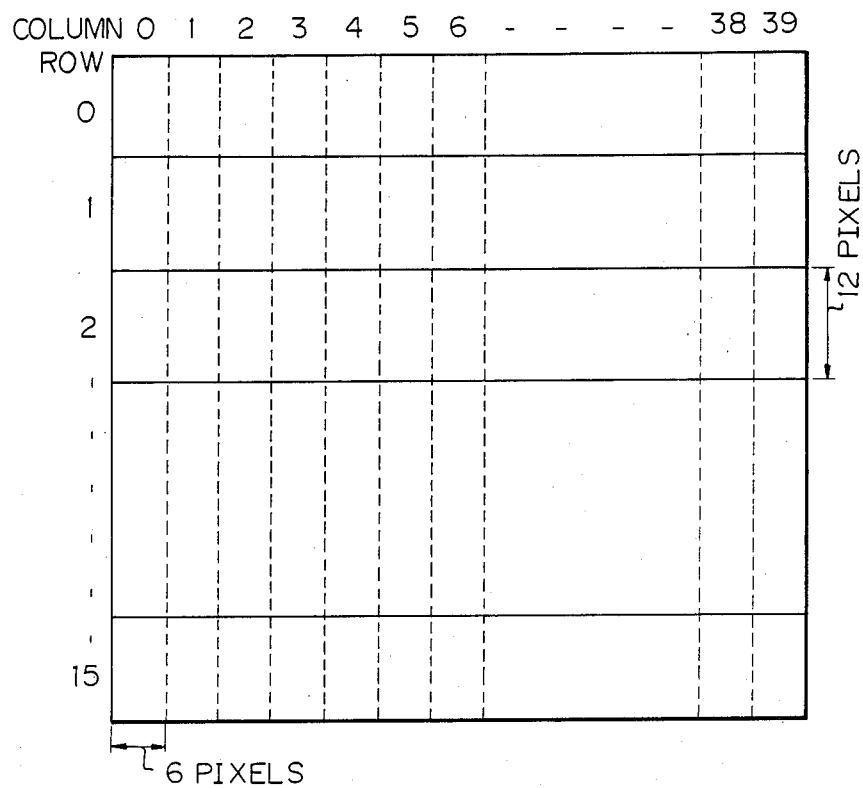

The font graphic in the graphic mode will be explained in detail. A region which is used in the display screen is called a screen region and the other region is called a border (BORDER) region. As a display device, either of a line display shown in FIG. 5A and a CRT display shown in FIG. 5B is used.

In the screen region of the line display, the location of the font is designated by two row addresses (ROW) of 0 and 1 and forty column addresses (COLUMN) of 0 to 39, while each font is specified by the data of the pack. One font consists of (6×12) pixels. Although (6×12) pixels are enough in case of displaying an alphabet, one character is displayed by (24×24) pixels in case of displaying Japanese (particularly, KANJI, i.e., chinese characters).

A size of the screen region of the CRT display corresponds to eight line displays arranged in parallel. Therefore, the location is designated by the row addresses of 0 to 15 and the column addresses of 0 to 39.

The color of the foreground or the color of the background of the font displayed in the screen region on the above-mentioned line display or CRT display is designated by three bits corresponding to each component of R (red), G (green) and B (blue). FIG. 6 is a color table showing the color represented by three bits.

Instructions (six bits of R S T U V W) of the font graphic are defined as follows.
1=0 0 0 0 0 1: Preset screen
2=0 0 0 0 1 0: Preset border
4=0 0 0 1 0 0: Light font (no flash)
5=0 0 0 1 0 1: Light font (with flash)
8=0 0 1 0 0 0: Scroll a predetermined row to the left on the line display
16=0 1 0 0 0 0: Scroll a predetermined row to the left on the CRT display
17=0 1 0 0 0 1: Scroll up a predetermined column on the CRT display
18=0 1 0 0 1 0: Scroll to the left on the CRT display
19=0 1 0 0 1 1: Scroll to the right on the CRT display
20=0 1 0 1 0 0: Scroll up on the CRT display.

In the case where the instruction is the preset screen or preset border (instruction 1 or 2), in the data region consisting of the 4th to 19th symbols in one pack, three bits of (R S T) in the fourth symbol are used as the data (COLOR) to designate the color and the other bits are all set to 0 as shown in FIG. 7A. The preset screen (instruction 1) presets the screen regions on the line display and CRT display into the designated color. The preset border (instruction 2) presets the border regions on the line display and CRT display into the designated color.

In case of the light font (instruction 4), the data region in the pack has a format shown in FIG. 7B. Three bits (COL 0) designates the background color in the font and (COL 1) designates the foreground color. RL and COLUMN-L denote the addresses of the font on the line display. ROW-C and COLUMN-C indicate the addresses of the font on the CRT display. (6×12) bits in the data region of the pack are the pixel data of the font, in which y indicates the leftmost top pixel in the font and z represents the rightmost bottom pixel in the font. The pixel 0 indicates the background color, while the pixel 1 denotes the foreground color. In addition, with respect to the font in case of the light font (with flash) (instruction 5), the foreground color and background color are alternately switched.

On the other hand, the instructions 8 and 16 shift the designated row to the left by only one address. The instruction 17 shifts the designated column to the right by only one address. The instruction 18 shifts all of the fonts on the CRT display to the left by only one address. The instruction 19 shifts all of the fonts on the CRT display to the right by only one address. The instruction 20 shifts all of the fonts on the CRT display upwardly by only one address. Although not shown, the data region of the pack is set to a predetermined format in correspondence upon these instructions.

The error correction codes regarding the above-mentioned subcoding signal will now be described. The Reed Solomon codes of (24, 20) are used as the error correction codes for the pack consisting of (6×24) bits. These Reed Solomon codes are over GF ($2^6$) (where, GF denotes a Galois Field) and have a polynomial of ($P(X)=X^6+X+1$). As a parity check matrix $H_p$ for the Reed Solomon codes, a matrix shown in FIG. 8 is used. A primitive element a over GF ($2^6$) is $$a = [0\ 0\ 0\ 0\ 1\ 0]$$

On the other hand, one pack of the reproduced data is expressed by a reproduced data matrix $V_p$ as shown in FIG. 8. Each suffix added to the twenty symbols denotes the symbol number of the subcoding signal and n in this suffix represents the number of the pack. $S_{24n}$ is a command; $S_{24n+1}$ is an instruction; $Q_{24n+2}$ and $Q_{24n+3}$ are parity symbols for this command and instruction; and $P_{24n+20}$, $P_{24n+21}$, $P_{24n+22}$, and $P_{24n+23}$ are parity symbols of the pack such as mentioned above. These parities of four symbols satisfy the relation of ($H_p \cdot V_p = 0$).

As the error correction codes for the command and instruction, the Reed Solomon codes of (4, 2) are used. These Reed Solomon codes are over GF ($2^6$) and have a polynomial of ($P(X)=X^6+X+1$). A parity check matrix $H_q$ and a reproduced data matrix $V_q$ are as shown in FIG. 9. A primitive element a over GF ($2^6$) is $$a = [0\ 0\ 0\ 0\ 1\ 0]$$

The parity symbols $Q_{24n+2}$ and $Q_{24n+3}$ satisfy the relation of ($H_q \cdot V_q = 0$). This embodiment relates to the case in which the data has a unit (n+k+m+1) symbols on which the data correcting encoding was carried out, where (n=2), (k=2), (m=16), and (l=4).

It is possible to correct one or two symbol errors and to detect three or more symbol errors by use of the Reed Solomon codes including four P parity symbols. On the other hand, it is possible to correct one symbol error and to detect two or more symbol errors by use of the Reed Solomon codes including two Q symbols.

Figure 10:
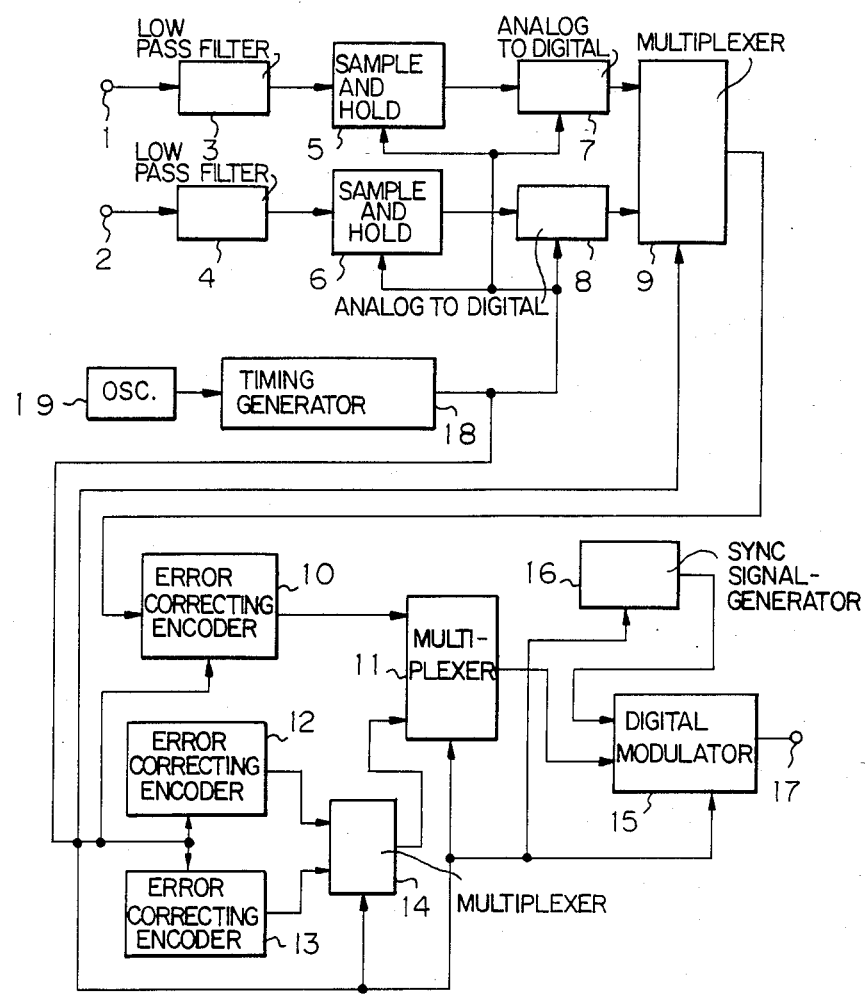
FIG. 10 is a block diagram showing an arrangement of the recording system of one embodiment of the invention.

FIG. 10 shows a fundamental arrangement for forming the data which is recorded on the compact disc. In FIG. 10, reference numerals 1 and 2 denote input terminals to which two-channel audio signals such as stereo audio signals are supplied from a source such as a tape recorder or the like. The audio signals in the respective channels are supplied to sample and hold circuits 5 and 6 through low-pass filters 3 and 4. Each sample is further converted to sixteen bits by A/D converters 7 and 8. These two-channel audio PCM signals are converted to the one-channel audio PCM signal by a multiplexer 9 and it is supplied to an error correcting encoder 10.

In the error correcting encoder 10, the audio PCM signal is subjected to the cross interleaving process and is encoded so that the error correction by the Reed Solomon codes can be performed. In the cross interleaving process, the data sequence is rearranged such that each symbol is included in two different error correction code series. An output of the error correcting encoder 10 is supplied to a multiplexer 11.

In addition, there are provided an encoder 12 regarding the P and Q channels of the subcoding signals and an encoder 13 with respect to the R to W channels. Outputs of these encoders are mixed by a multiplexer 14 and are supplied to the multiplexer 11. An output of the multiplexer 11 is supplied to a digital modulator 15 and is subjected to the modulation due to the 8-to-14 conversion. In this case, a frame sync generated from a sync signal generator 16 is mixed and the mixed signal is fetched from an output terminal 17. The encoder 12 regarding the P and Q channels adds the CRC codes of sixteen bits to the Q channel. The encoder 13 regarding the R to W channels performs the error correction coding using the Reed Solomon codes and interleaving.

On one hand, clock pulses and timing signals produced by a timing generator 18 are supplied to each circuit such as the sample and hold circuits 5 and 6, A/D converters 7 and 8, multiplexers 9, 11 and 14, etc. Also, an oscillator 19 generates a master clock.

Figure 11:
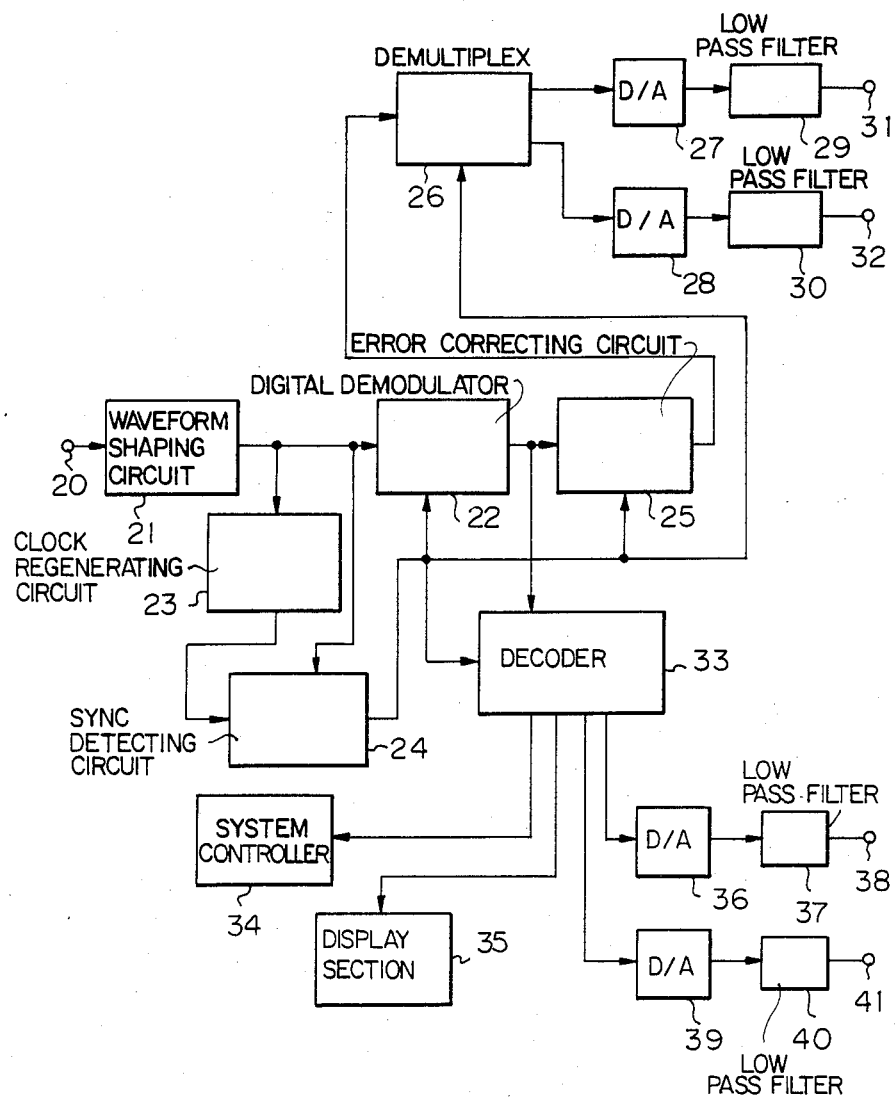
FIG. 11 is a block diagram showing an arrangement of the reproducing system of one embodiment of the invention.

FIG. 11 shows an arrangement of the reproducing system for processing the signals reproduced from the compact disc. The signals optically reproduced from the compact disc are supplied to an input terminal indicated at 20.

This reproduced signal is supplied through a waveform shaping circuit 21 to a digital demodulator 22, a clock regenerating circuit 23, and a sync detecting circuit 24. The bit clock synchronized with the reproduced data is fetched by the clock regenerating circuit 23 having the PLL constitution. Also, the sync detecting circuit 24 detects the frame sync and generates the timing signals synchronized with the reproduced data and supplies a predetermined timing signal to each circuit of the reproducing system. The data in the main channel in an output of the digital demodulator 22 is subjected to the processings for error detection, error correction and interpolation in an error correcting circuit 25. In addition, the subcoding signals are subjected to the processings for error detection and error correction in a decoder 33.

An output of the error correcting circuit 25 is supplied to a demultiplexer 26 and is divided into the two-channel signals. These signals in the respective channels are transmitted through D/A converters 27 and 28 and low-pass filters 29 and 30, so that the reproduced audio signals in the respective channels appear at output terminals 31 and 32.

The P- and Q-channel data of the subcoding signals obtained from the decoder 33 are supplied to a system controller 34 consisting of a microcomputer and are used to perform the operations such as the operation for searching the beginning of each music program, the random selection of music programs and the like. The time code included in the Q channel is supplied to a display section 35 and is displayed.

In addition, the display data included in the R to W channels are converted to the analog signal by a D/A converter 36. This analog signal is fetched at an output terminal 38 through a low-pass filter 37. This display signal is supplied to the CRT display. Further, the audio data such as the explanation of music programs included in the R to W channels is fetched at an output terminal 41 through a D/A converter 39 and a low-pass filter 40 and is supplied to a speaker through a low-frequency amplifier (not shown).

Figure 12:
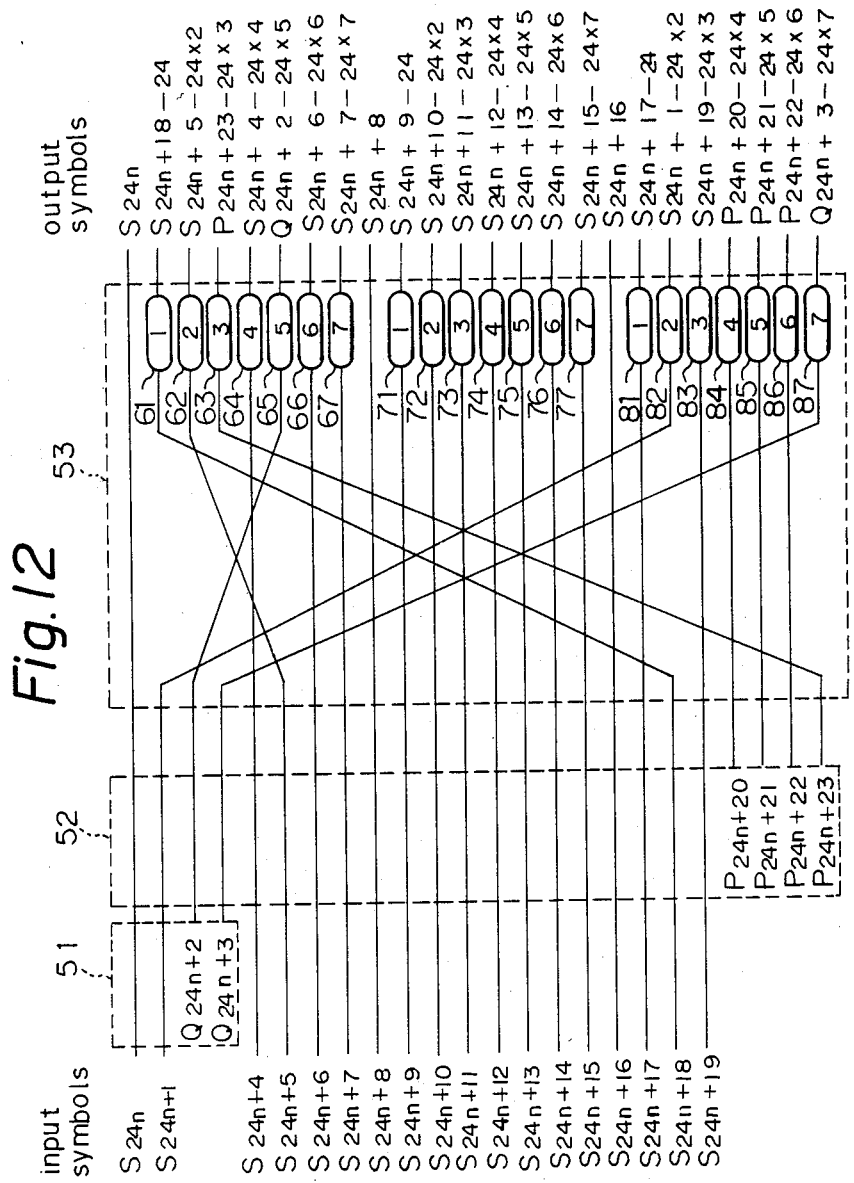
FIG. 12 is a block diagram showing an arrangement of an error correcting encoder in one embodiment of the invention.

The encoder 13 regarding the R to W channels is provided with an error correcting encoder shown in FIG. 12.

As indicated by broken lines, the error correcting encoder comprises: a Q parity generator 51 of the above-mentioned Reed Solomon codes of (4, 2); a P parity generator 52 of the above-mentioned Reed Solomon codes of (24, 20); and an interleaving circuit 53. Total eighteen symbols of $S_{24n}$, $S_{24n+1}$, $S_{24n+4}$ to $S_{24n+19}$ of the n-th pack are input to this error correcting encoder.

Two symbols $S_{24n}$ and $S_{24n+1}$ are supplied to the Q parity generator 51 and the parity symbols of $Q_{24n+2}$ and $Q_{24n+3}$ are generated. Twenty symbols including these Q parities are input to the P parity generator 52 and four parity symbols are generated. Twenty four symbols output from the P parity generator 52 are supplied to the interleaving circuit 53.

The interleaving circuit 53 is constituted by a RAM and its address controller and generates output data of which predetermined delay amounts were added to the respective symbols of the input data by controlling the write address and read address. In FIG. 12, means for adding predetermined delay amounts to the respective symbols is represented as a plurality of delay elements for simplicity of the understanding. As these delay elements, there are used: delay elements 61, 71 and 81 to give the delay amount of one pack (24 symbols); delay elements 62, 72 and 82 to give the delay amount of two packs; delay elements 63, 73 and 83 to give the delay amount of three packs; delay elements 64, 74 and 84 to give the delay amount of four packs; delay elements 65, 75 and 85 to give the delay amount of five packs; delay elements 66, 76 and 86 to give the delay amount of six packs; and delay elements 67, 77 and 87 to give the delay amount of seven packs. On the other hand, the delay amount is zero with respect to the symbols whereby no delay element is inserted. In this way, three sets of eight kinds of delay amounts of zero to seven packs are provided.

Figure 13:
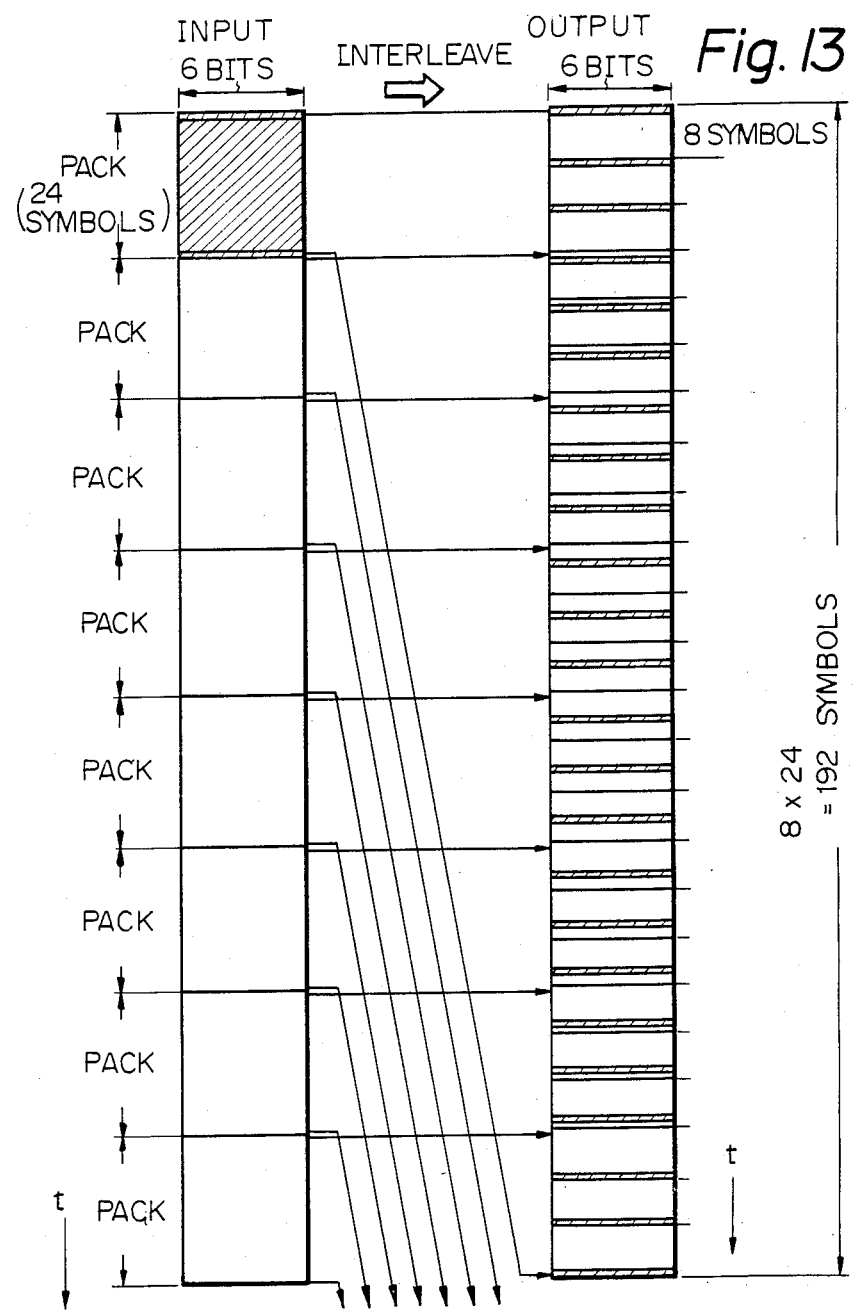
FIGS. 13, 14 and 15 are schematic diagrams which are used for explaining the interleave processing by the error correcting encoder.

The interleaving circuit 53 performs the interleaving as shown in FIG. 13. FIG. 13 shows in parallel the consecutive eight packs of the input data series and the output data series having the same length as that of the input data series. Now, when an attention is paid to the first one pack (indicated by the hatched region) of the input data series, the twenty-four symbols in this pack are distributed into the locations which are apart from one another by only the distance of eight symbols or nine symbols in the output data series. When the output data series is divided into equal parts at a distance of eight symbols, three symbols in the relevant pack are arranged as the first symbol in each of the first to third groups each consisting of eight symbols. Three symbols of the above pack are arranged as the second symbol in each of the fourth to sixth groups each of which consists of eight symbols.

In the same manner as above, three symbols of the above pack are arranged into the locations which are shifted by one symbol at a time for every three groups each of which consists of eight symbols. Therefore, three symbols of the above pack are arranged as the eighth symbol in each group in the last three 8-symbol groups in the output data series shown in FIG. 13. The symbols in the above pack are arranged with a distance corresponding to the respective eight symbols in the twenty four symbols consisting of these three 8-symbol groups. In addition, the distance of nine symbols exists at the boundary portion of the three 8-symbol groups since there is a shift of one symbol.

The symbols in a plurality of packs with the timings after the above pack are interleaved and arranged into the locations before the locations of the symbols in the above pack in the 8-symbol group in the manner similar to the above pack. Further, the symbols in a plurality of packs with the timings before the above pack are interleaved and arranged into the locations behind the locations of the symbols in the above pack in the 8-symbol group in the manner similar to the above pack.

As the result of the measurement of the error state in the subcoding signal reproduced from the compact disc, it has been found that the burst error of four or more symbols hardly occurs. Therefore, by distributionally recording the 24 symbols included in the same series of the Reed Solomon codes of (24, 20) in the manner as described above, it is possible to effectively prevent that two or more symbols become the erroneous symbols and the error correction becomes impossible.

On the other hand, as shown in FIG. 12, the interleaving circuit 53 performs the interleaving such as to enlarge the distance itself between the symbols for the command and instruction and for these Q-parity included in the same pack as compared with the other symbols. As shown in FIG. 12, for this purpose, the interleaving circuit 53 includes six oblique supply lines instead of constituting all of the supply lines of the input symbols for the respective delay elements as the parallel lines.

Figure 14:
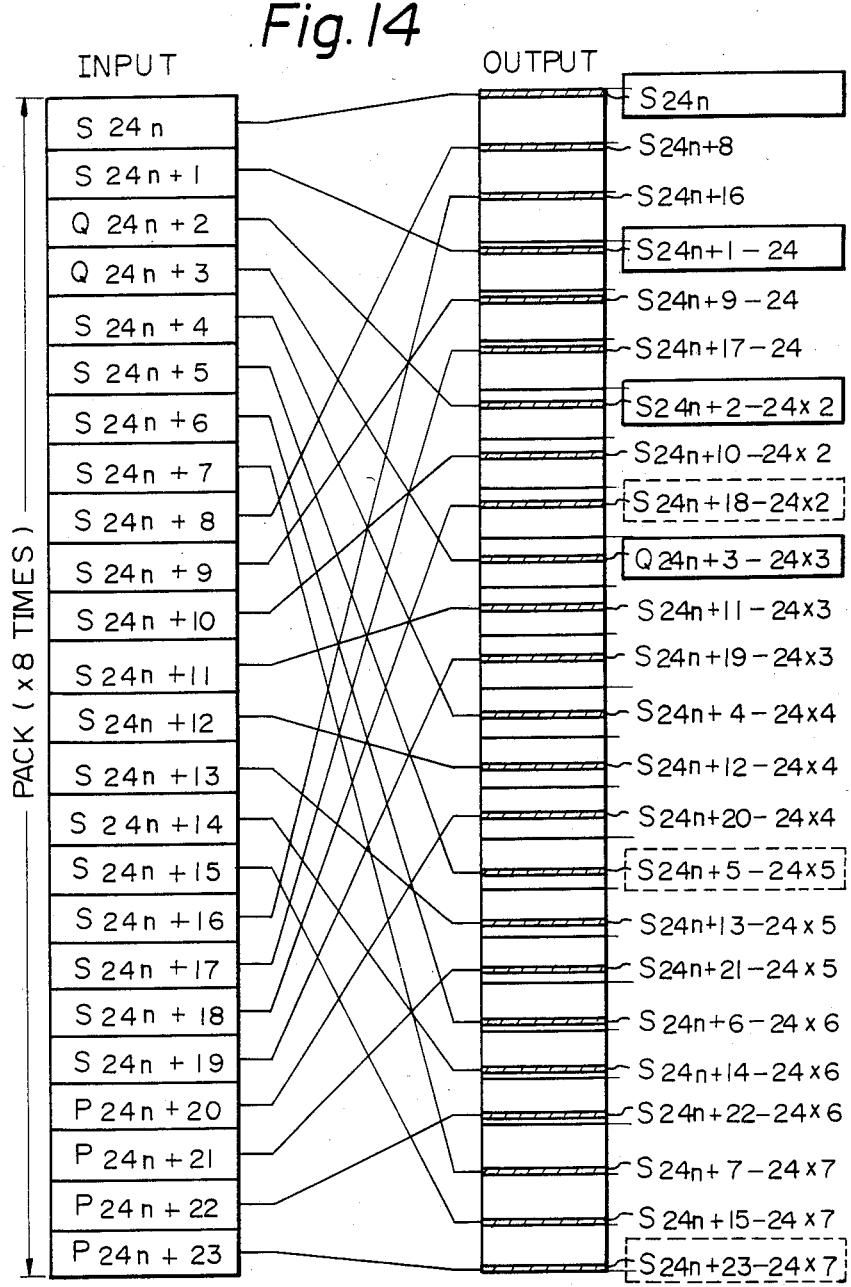
Figure 15:
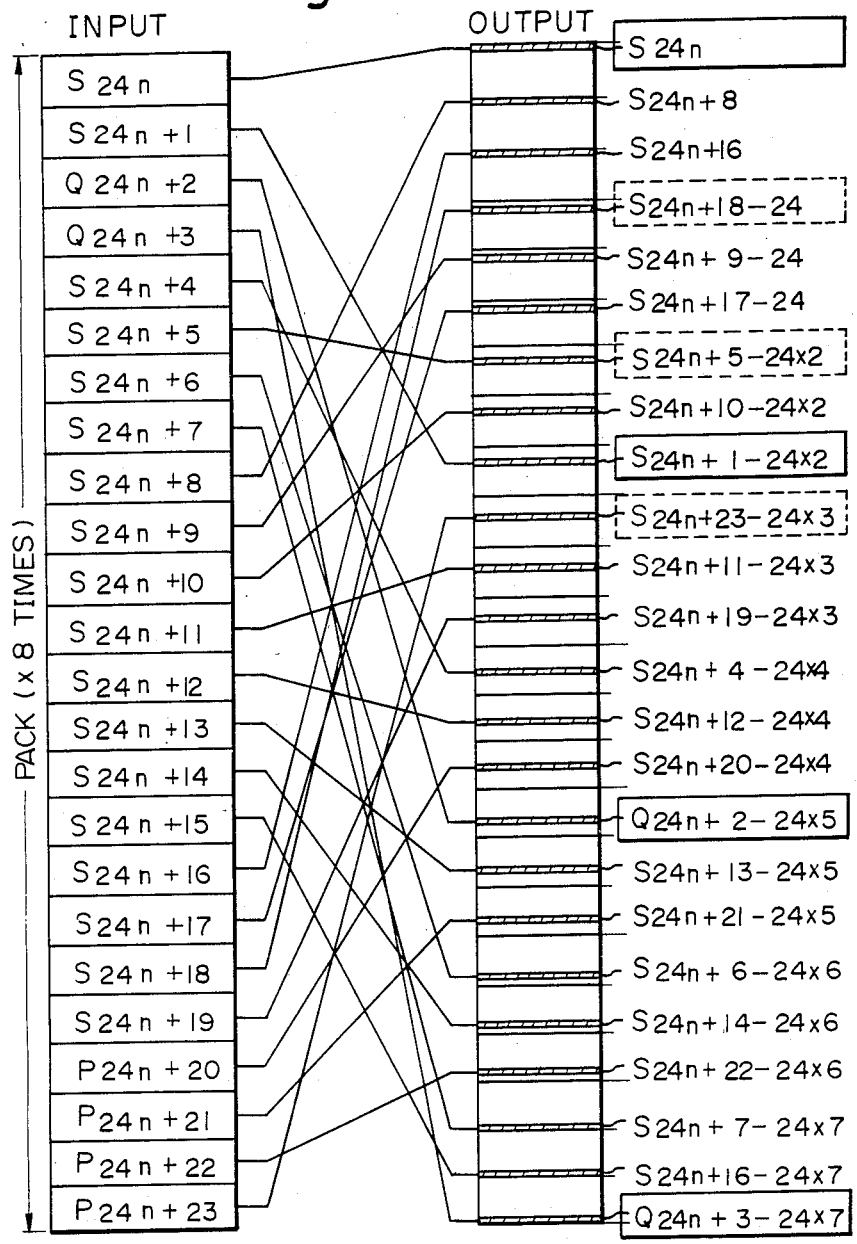

Assuming that all of the supply lines of the input symbols are parallel in order to clarify the feature of this interleaving, the correspondence relation between the 24 symbols in one pack and the data locations in the output series after the interleaving will be as shown in FIG. 14. In FIG. 14 and FIG. 15 which will then be explained, the time width of one pack of the input data is enlarged by eight times as compared with the inherent time width.

As shown in FIG. 14, the delay amounts of 0, one pack, two packs, three packs, . . ., seven packs are respectively given to the first eight symbols of $S_{24n}$, $S_{24n+1}$, $Q_{24n+2}$, $Q_{24n+3}$, . . ., $S_{24n+7}$ of the input symbols. Therefore, in the output data series, these eight symbols are changed such that their symbol numbers become $(-24)$, $(-24 \times 2)$, $(-24 \times 3)$, . . ., $(-24 \times 7)$. The delay amounts of zero, one pack, . . ., seven packs are also respectively given to the next eight symbols of $S24n+8$, . . ., $S_{24n+15}$ of the input symbols. The similar delay amounts are also given to the further next eight symbols of $S_{24n+16}$, . . ., $S_{24n+23}$. As the result of such interleaving, the mutual distances among the first four symbols in the pack are equal and are 24 symbols.

In one embodiment of the present invention, the interleaving circuit 53 is used which supplies the symbol $S_{24n+1}$ to a delay element 82; supplies the symbol $S_{24n+18}$ to the delay element 61; supplies the symbol $Q_{24n+2}$ to the delay element 65; supplies the symbol $S_{24n+5}$ to the delay element 62; supplies the symbol $Q_{24n+3}$ to a delay element 87; and supplies the symbol $P_{24n+23}$ to the delay element 63. Thus, the mutual locations of the above-mentioned pair of symbols are exchanged and the correspondence relation between the input data series and the data series after the interleaving is as shown in FIG. 15. As will be obvious from FIG. 15, the mutual distances among the first four symbols in the pack are as shown below.

Distance between $S_{24n}$ and $S_{24n+1}$: 65 symbols
Distance between $S_{24n+1}$ and $Q_{24n+2}$: 58 symbols
Distance between $Q_{24n+2}$ and $Q_{24n+3}$: 65 symbols.

In this way, the mutual distances among the four symbols can be enlarged by two or more times as compared with 25 symbols and it is possible to further raise the error correcting capability with respect to the burst error occurring in the reproduced data.

Figure 16:
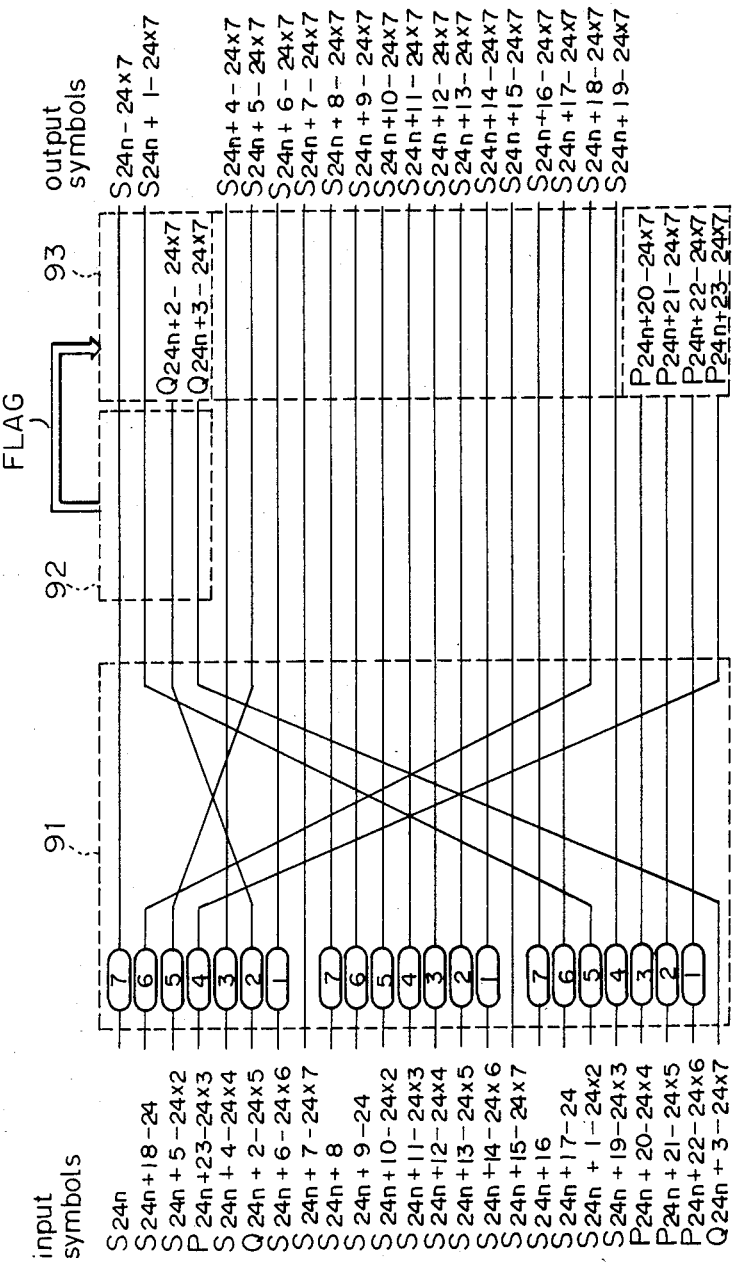
FIG. 16 is a block diagram showing an arrangement of an error correcting decoder in one embodiment of the invention.

FIG. 16 shows an error correcting decoder regarding the R to W channels provided in the decoder 33 for the subcoding signal of the reproducing system.

As indicated by broken lines, this error correcting decoder comprises: a deinterleaving circuit 91 to which twenty-four symbols in one pack of the reproduced subcoding signal are supplied; a Q-decoder 92 for the Reed Solomon codes of (4, 2) to which the first four symbols in an output of the deinterleaving circuit 91 are supplied; and a P-decoder 93 for the Reed Solomon codes of (24, 20) to which the symbols in one pack are supplied, wherein this one pack consists of the above-mentioned four symbols which were error corrected by the decoder 92 and the twenty symbols from the deinterleaving circuit 91. A first flag (called a Q flag) indicative of the number (including 0) of erroneous symbols from the Q-decoder 92 is supplied to the P-decoder 93. Flags which are produced and represent the number (including 0) of erroneous symbols and the error locations and the Q flag are used for error correction in the P-decoder 93.

The input data to the deinterleaving circuit 91 corresponds to the output data of the interleaving circuit 53 of FIG. 12. The deinterleaving such as to cancel the delay amounts given by the interleaving circuit 53 and to allow each symbol to equally have the delay amount of seven packs is executed. Actually, this deinterleaving is performed by controlling the write address and the read address of the RAM. In FIG. 16, the deinterleaving circuit 91 is shown as the arrangement such that the delay elements having predetermined delay amounts are arranged on the transmission lines of the respective symbols. The delay elements of seven packs are respectively inserted into the transmission lines of the symbols whose delay amounts are zero in the interleaving circuit 53. The delay elements of six packs, five packs, four packs, three packs, two packs, and one pack are respectively inserted into the transmission lines of the symbols having the delay amounts of one pack, two packs, three packs, four packs, five packs, and six packs in the interleaving circuit 53. No delay element is inserted into the transmission line of the symbol having the delay amount of seven packs in the interleaving circuit 53.

The error correcting operations which are performed by the Q-decoder 92 and P-decoder 93 will then be described with reference to a flowchart of FIGS. 17A and 17B and a table of FIG. 18.

Figure 17A:
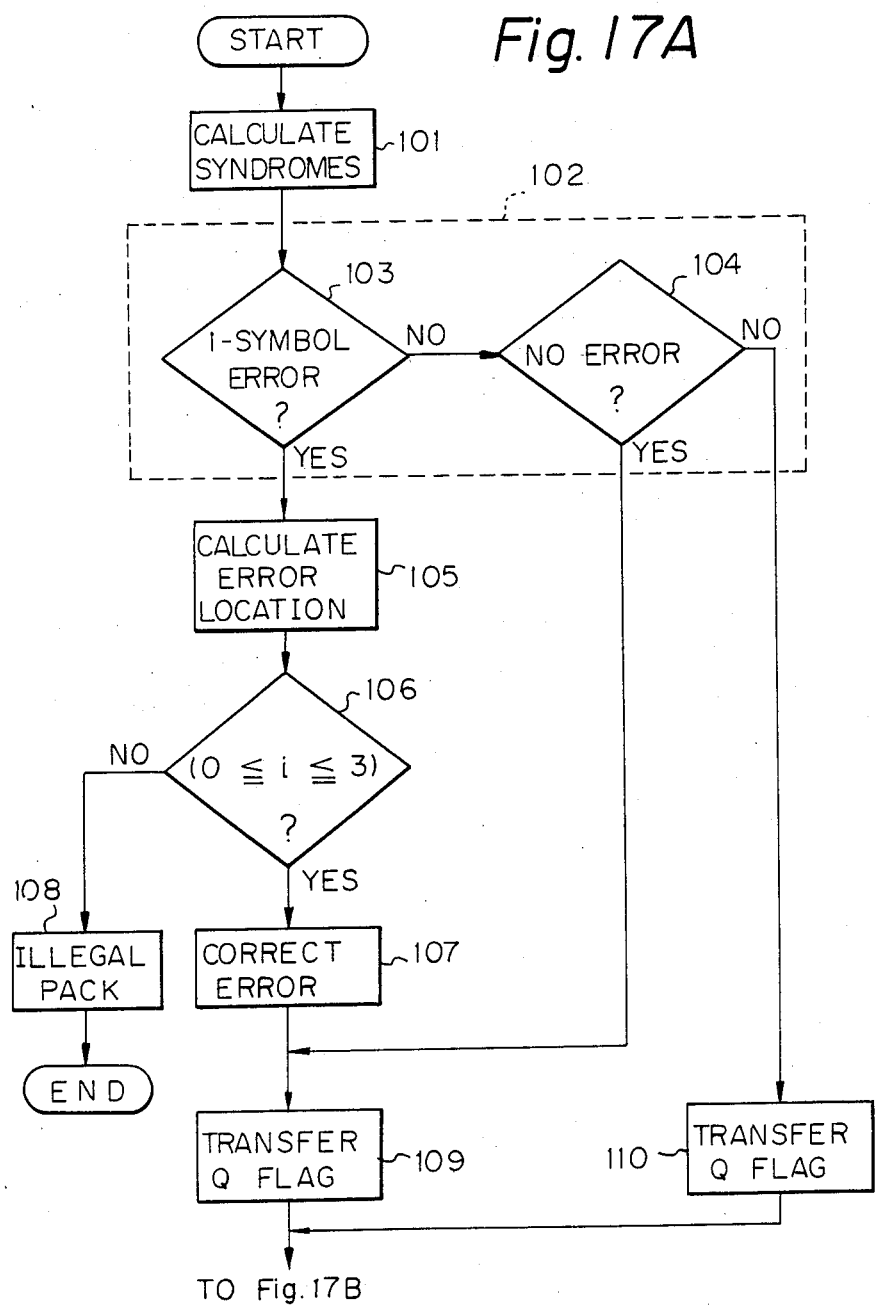
Figure 17B:
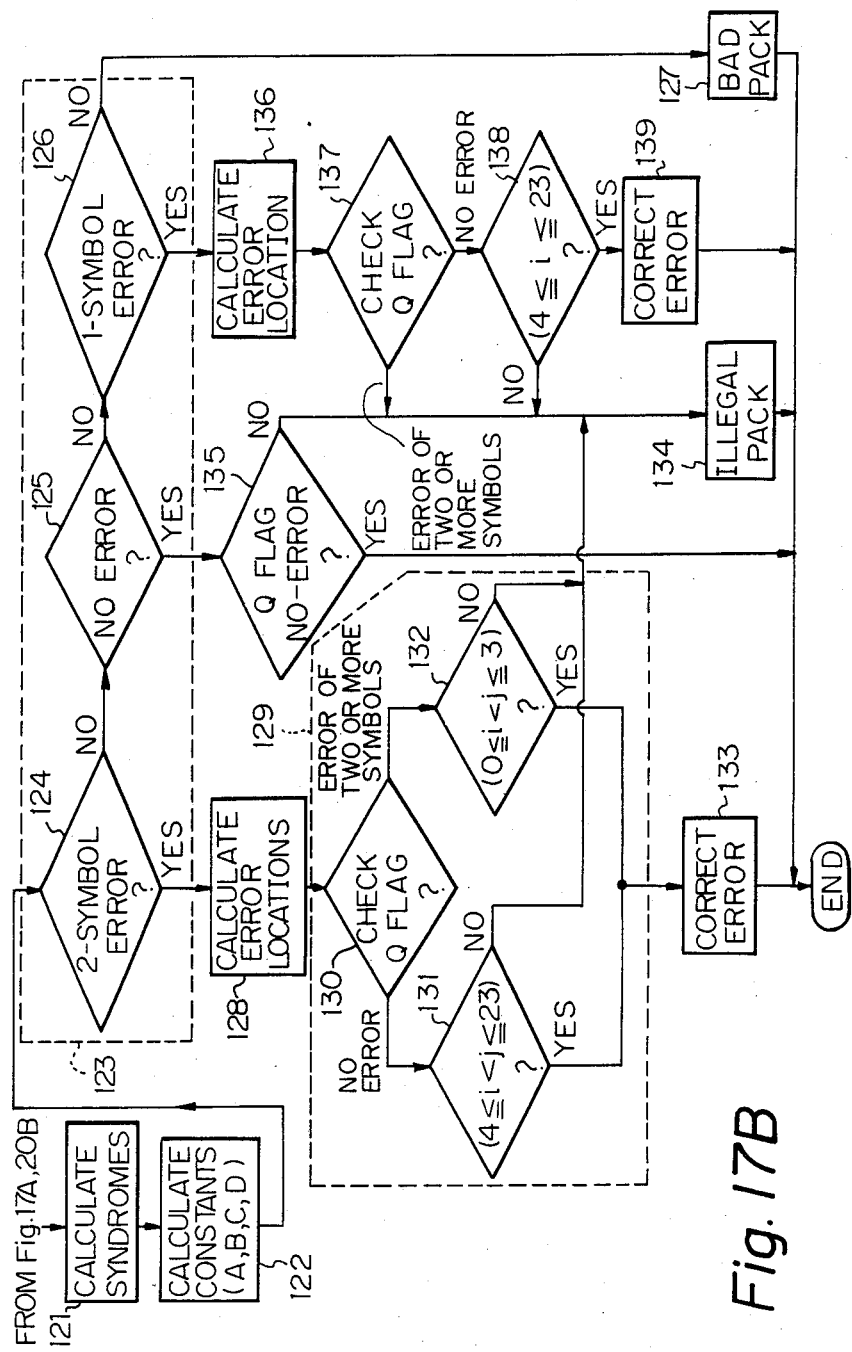

FIG. 17A shows the decoding process which is performed by the Q-decoder 92 and FIG. 17B shows the decoding process which is carried out by the P-decoder 93. Fundamentally, the Q-decoder 92 can correct one-symbol error among the four symbols, while the P-decoder 93 can correct the one-symbol or two-symbol errors among the 24 symbols. First, syndromes $S_{r0}$ and $S_{r1}$ are produced by the Q-decoder 92 (step 101). This calculation is expressed by $$S_{r0} = \sum_{i=0}^{3} S_i \text{ and } S_{r1} = \sum_{i=0}^{3} \alpha^{3-i} S_i$$

where i is a symbol number. The operations are all performed by (mod. 2). Next, a size of error is discriminated using these syndromes (step 102).

The discrimination is made to see if the error is the one-symbol error or not (step 103). In the case where it is not the one-symbol error, it is checked to see if no error is detected (namely, $S_{r0}=0$ and $S_{r1}=0$) or not (step 104). In case of the one-symbol error, the calculation of the error location is performed (step 105). The error location i is obtained by $$3 - \log \alpha \frac{S_{r1}}{S_{r0}} = i$$

The error location i obtained in this way is checked to see if it is included in the range of ($0 \leq i \leq 3$) or not (step 106).

In the case where the error location i is included in this range, the error correction (step 107) is performed. Assuming that a reproduced symbol is $\overline{S_i}$, the error correction is carried out by the operation of ($\overline{S_i} + S_{r0} = S_i$). If the error location i obtained is not included in the above range, the pack of these 24 symbols is regarded as the illegal (incorrect, and therefore the error correction should not be performed) pack, so that all of the symbols are abandoned (step 108). Namely, the symbols in the pack in the case where the command and instruction are the errors are all considered to be invalid.

In addition, the Q flag indicating that no error is detected (including the case where the one-symbol error was corrected) is transferred to the P-decoder 93 (step 109), and the Q flag representing the case where there is the error of two or more symbols is transferred to the P-decoder 93 (step 110).

As shown in FIG. 17B, in the P-decoder 93, the syndromes $S_{r0}$, $S_{r1}$, $S_{r2}$, and $S_{r3}$ are first calculated as the following expressions (step 121).

$$S_{r0} = \sum_{i=0}^{23} S_i$$

$$S_{r1} = \sum_{i=0}^{23} \alpha^{23-i} S_i$$

$$S_{r2} = \sum_{i=0}^{23} \alpha^{2(23-i)} S_i$$

$$S_{r3} = \sum_{i=0}^{23} \alpha^{3(23-i)} S_i$$

The operations to obtain the size of error and the error location are performed using these four syndromes $S_{r0}$ to $S_{r3}$. In order to execute these operations simply and at a high speed, the constants A, B, C, and D as shown by the following expressions are calculated (step 122).

$$A = S_{r0} S_{r2} + S_{r1}^2$$

$$B = S_{r1} S_{r2} + S_{r0} S_{r3}$$

$$C = S_{r1} S_{r3} + S_{r2}^2$$

Next, the size of error is discriminated (step 123) using the above-mentioned syndromes and constants. A second flag indicative of the size of error and the error location is formed by this discrimination and the calculation for the error location which will be mentioned later. By checking whether the relations of ($S_{r0} \neq 0$, $S_{r3} \neq 0$, $A \neq 0$, $B \neq 0$, $C \neq 0$) are satisfied or not, the discrimination is made to see if the error is the 2-symbol error or not (step 124).

In the case where the error is not the 2-symbol error, the discrimination is performed to see if the error is detected or not (step 125). When the relations of ($S_{r0}=0$, $S_{r3}=0$, $A=B=C=0$) are satisfied, it is determined that no error is detected.

In the case where the error is detected, it is checked to see if the error is the 1-symbol error or not (step 126). In the case where the relations of ($S_{r0}=0$, $S_{r3} \neq 0$, $A=B=C=0$) are satisfied, the error is the 1-symbol error. When it is not the 1-symbol error, the error is the error of three or more symbols. Thus, it is processed (step 127) as a bad pack (incorrect pack). The symbols in the bad pack are all abandoned similar to the case of the illegal pack.

In case of the 2-symbol error, the calculation for the error location is performed (step 128). The error locations i and j are obtained in the manner as follows.

$$i = 23 - \log \alpha \left( \frac{B/A}{1 + \alpha^{-(j-i)}} \right)$$

$$j = 23 - \log \alpha \left( \frac{B/A}{1 + \alpha^{(j-i)}} \right)$$

These error locations i and j are checked to see if they are correct or not using the Q flag (step 129). The Q flag is checked to see if it indicates no-error or the error of two or more symbols (step 130).

When the Q flag represents no-error, the location check (step 131) is performed. When the relation of ($4 \leq i < j \leq 23$) is satisfied, the error location is correct, so that the 2-symbol error is corrected (step 133). In the case where the above relation is not satisfied, it is contradictory to the result of the error detection of the Q-decoder 92. Thus, the pack is processed as the illegal pack (step 134). This corresponds to the cases 3 and 7 in the table of FIG. 18. In this case 7, one symbol at either one of the error locations among 0 to 3 is corrected by the Q-decoder 92 and two symbols at the error locations included in 4 to 23 are corrected by the P-decoder 93, so that the error of three symbols in one pack can be corrected.

When the Q flag indicates the error of two or more symbols, the location check (step 132) is performed. This location check is performed to check whether the relation of ($0 \leq i < j \leq 3$) is satisfied or not. If this relation is satisfied, the 2-symbol error will be corrected (step 133). This corresponds to the case 11 of FIG. 18. Unless this relation is satisfied, the pack will be processed as the illegal pack.

The correction of the 2-symbol error (step 33) is the processing to obtain error patterns $e_i$ and $e_j$ and to add them to the reproduced symbols. Namely, $$e_i = \frac{S_{r1}}{B/A} + \frac{S_{r0}}{1 + \alpha^{j-i}}$$

-continued $$e_j = \frac{S_{r1}}{B/A} + \frac{S_{r0}}{1 + \alpha^{-(j-i)}}$$

$$\overline{S_i} + e_i = S_i$$

$$\overline{S_j} + e_j = S_j$$

In the case where the result of the error detection by the P-decoder 93 indicates no-error, the Q flag is checked to see if it indicates no-error or not (step 135). When the Q flag indicates no-error, this pack is determined such that this pack really includes no error symbol. This corresponds to the cases 1 and 5 in the table of FIG. 18. On the contrary, when the Q flag represents the presence of the error of two or more symbols, it is contradictory to the decoding result by the P-decoder 93. Thus, the pack is processed as the illegal pack. This corresponds to the case 9 in the table of FIG. 18.

When the result of the error detection by the P-decoder 93 indicates the 1-symbol error, the calculation for the error location i is performed (step 136). This calculation is as follows.

$$i = \left( 23 - \log \alpha \frac{S_{r1}}{S_{r0}} \right)$$

Next, the Q flag is checked. If the Q flag indicates no-error, the location check (step 138) will be performed. When the relation of ($4 \leq i \leq 23$) is satisfied, it is not inconsistent with the result of the Q decoding, so that the error correction of ($S_i + S_{r0} = S_i$) is performed (step 139). This corresponds to the cases 2 and 6 in FIG. 18. Unless the above-mentioned relation is satisfied, the pack will be processed as the illegal pack.

When the result of the P-decoder indicates the 1-symbol error and the Q flag represents the error of two or more symbols, this situation cannot be inherently caused. Therefore, the pack is processed as the illegal pack. This corresponds to the case 10 in FIG. 18.

Further, as the result of the P decoding, when the error of three or more symbols is detected, the pack is processed as the bad pack (step 127). This corresponds to the cases 4, 8 and 12 in FIG. 18.

Figure 19:
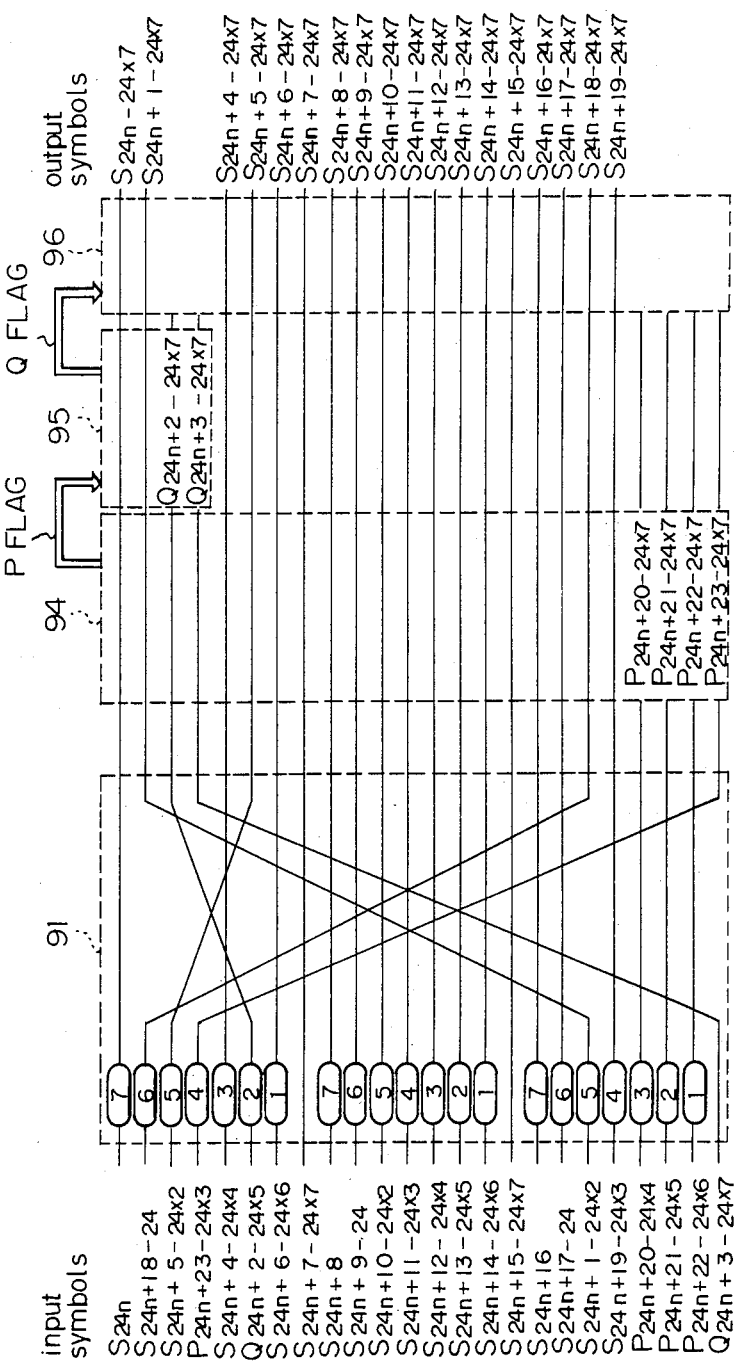
FIG. 19 is a block diagram showing an arrangement of an error correcting decoder in another embodiment of the present invention.

As shown in FIG. 19, another embodiment of the error correcting decoder comprises: in place of the Q-decoder 92 for the Reed Solomon codes of (4, 2) and the P-decoder 93 for the Reed Solomon codes of (24, 20) in FIG. 16 showing the first embodiment, a $P_1$-decoder 94 to which an output of the deinterleaving circuit 91 is supplied; a Q-decoder 95 for the Reed Solomon codes of (4, 2) to which the first four symbols in an output of the $P_1$-decoder 94 are supplied; and a $P_2$-decoder 96 for the Reed Solomon codes of (24, 20) to which the symbols in one pack are supplied, wherein this one pack consists of the above-mentioned four symbols of which the error correction was performed by the Q-decoder 95 and twenty symbols which were output from the $P_1$-decoder 94.

The $P_1$-decoder 94 detects a size of error and calculates the error locations in the respective cases of the one-symbol error and two-symbol error with respect to 24 symbols in one pack. A flag (called a P flag) indicating these information is supplied to the Q-decoder 95. The Q-decoder 95 performs the error correction using this P flag. The Q-decoder 95 performs the error correction and generates a flag (called a Q flag) representing the number (including 0) of erroneous symbols. This Q flag is supplied to the P₂-decoder 96. A flag indicating the number (including 0) of erroneous symbols caused in the P₂-decoder 96 and the error locations and the Q flag are used for the error correction by the P₂-decoder 96. The error correcting operations which are performed by the P₁-decoder 94, Q-decoder 95 and P₂-decoder 96 will now be described in more detail.

Figure 20A:
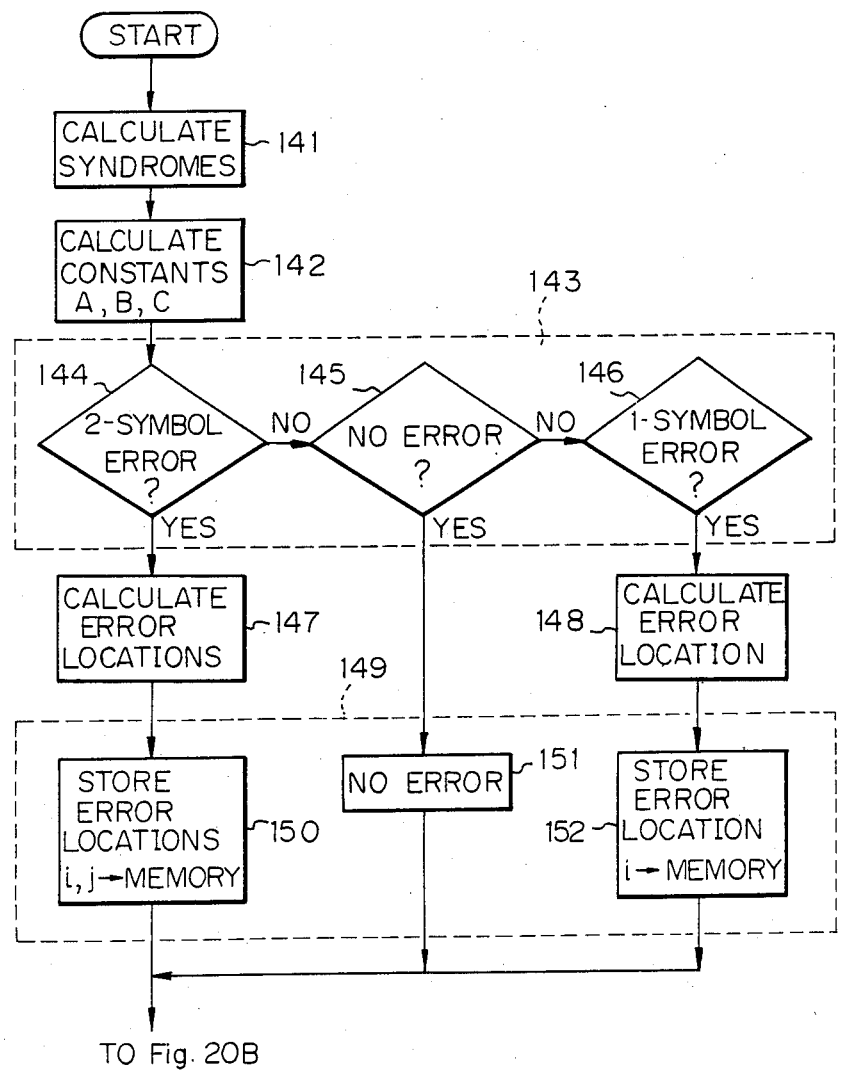
FIGS. 20A and 20B are flow charts used for explaining the error correcting decoder shown in FIG. 19.
Figure 20B:
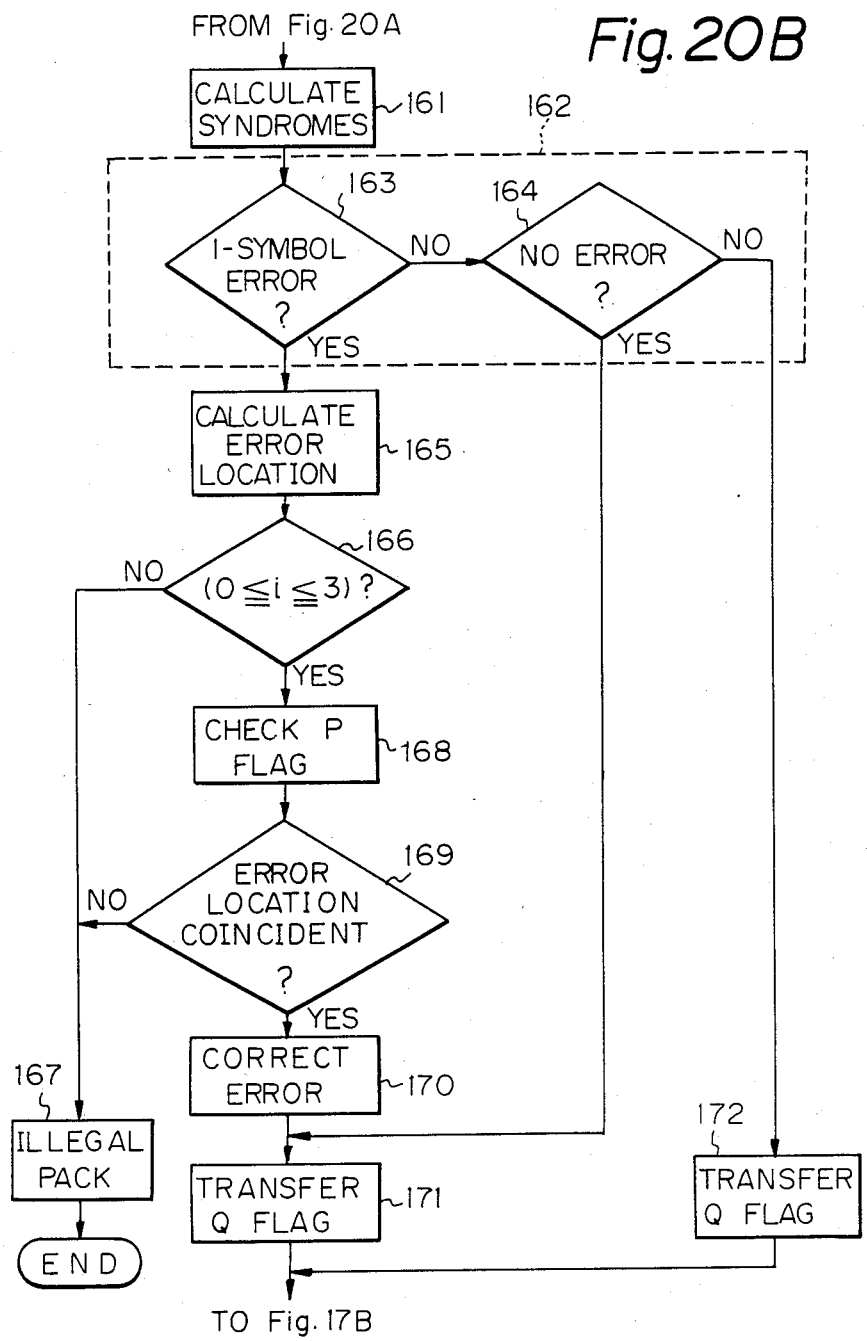

A flowchart shown in FIG. 20A shows the decoding process which is executed by the P₁-decoder 94. A flowchart shown in FIG. 20B shows the decoding process which is performed by the Q-decoder 95. The decoding process which is carried out by the P₂-decoder 96 is the same as the flowchart shown in FIG. 17B. Fundamentally, the Q-decoder 95 can correct the 1-symbol error among the four symbols, while the P₂-decoder 96 can correct the 1-symbol of 2-symbol errors among the 24 symbols. In the P₁-decoder 94, syndromes $S_{r0}$, $S_{r1}$, $S_{r2}$, and $S_{r3}$ are first produced (step 141). When the symbol location is expressed by i, these calculations are represented by the following expressions. In addition, the operations are all performed by (mod. 2).

$$S_{r0} = \sum_{i=0}^{23} S_i$$

$$S_{r1} = \sum_{i=0}^{23} \alpha^{23-i} S_i$$

$$S_{r2} = \sum_{i=0}^{23} \alpha^{2(23-i)} S_i$$

$$S_{r3} = \sum_{i=0}^{23} \alpha^{3(23-i)} S_i$$

The operations to obtain the size of error and the error location are performed using these four syndromes $S_{r0}$ to $S_{r3}$. In order to carry out these operations simply and at a high speed, the constants A, B and C as shown in the following expressions are calculated (step 142).

$$A = S_{r0} S_{r2} + S_{r1}^2$$

$$B = S_{r1} S_{r2} + S_{r0} S_{r3}$$

$$C = S_{r1} S_{r3} + S_{r2}^2$$

Next, the size of error is discriminated (step 143) using the above-mentioned syndromes and constants. Due to this discrimination and the calculations for the error locations which will be mentioned later, the P flag representing the size of error and error locations is formed. The discrimination is made to see if the error is the 2-symbol error or not (step 144) by checking whether the relation of ($S_{r0} \neq 0$, $S_{r3} \neq 0$, $A \neq 0$, $B \neq 0$, $C \neq 0$) is satisfied or not.

When there is not a 2-symbol error, the discrimination is made to see if an error is detected or not (step 145). When the relation of ($S_{r0}=0$, $S_{r3}=0$, $A=B=C=0$) is satisfied, it is determined that no error exists.

In the case where it is not no-error, the discrimination is made to see if there is the 1-symbol error or not (step 146). When the relation of ($S_{r0} \neq 0$, $S_{r0} \neq 0$, $A=B=C=0$) is satisfied, there is the 1-symbol error. If there is not the 1-symbol error, it is an error of three or more symbols.

In case of the 2-symbol error, the calculations for the error locations (step 147) are executed. The error locations i and j are obtained in the manner as follows.

$$i = 23 - \log \alpha \left( \frac{B/A}{1 + \alpha^{-(j-i)}} \right)$$

$$j = 23 - \log \alpha \left( \frac{B/A}{1 + \alpha^{(j-i)}} \right)$$

On the other hand, in case of the 1-symbol error, the calculation for the error location (step 148) is performed. The error location i is obtained by $$i = 23 - \log \alpha \frac{S_{r1}}{S_{r0}}$$

The P flag obtained by the P₁-decoder 94 in this way is transferred to the Q-decoder 95 at the next stage (step 149). Namely, the error locations of the 1-symbol error or 2-symbol error are stored in the memory (steps 150 and 152) and a flag indicative of no-error is generated (step 151).

In the Q-decoder 95, as shown in FIG. 20B, the syndromes $S_{r0}$ and $S_{r1}$ are first produced (step 161). These calculations are represented by $$S_{r0} = \sum_{i=0}^{3} S_i \text{ and } S_{r1} = \sum_{i=0}^{3} \alpha^{3-i} S_i$$

Next, the size of error is discriminated (step 162) using these syndromes.

The discrimination is made to see if the error is the 1-symbol error or not (step 163). When the error is not the 1-symbol error, the discrimination is made to see if it is no-error (i.e., $S_{r0}=0$ and $S_{r1}=0$) or not (step 164). In case of the 1-symbol error, the calculation for the error location (step 165) is performed. The error location i is obtained by $$3 - \log \alpha \frac{S_{r1}}{S_{r0}} = i$$

The error location i obtained in this way is checked to see if it is included in the range of ($0 \leq i \leq 3$) or not (step 166).

When the error location i is included in this range, the P flag is checked (step 168) to see if the location i coincides with the error location by the P flag or not (step 169). When they are coincident, the error correction (step 170) is executed. When the regenerative symbol is $\overline{S_i}$, the error correction is performed by the operation of ($\overline{S_i} + S_{r0} = S_i$). In the case where the error location i derived is not included in the above-mentioned range or where the error location does not coincide with that by the P flag, the pack including those 24 symbols is regarded as the illegal (incorrect, and therefore the error correction should not be performed) pack, so that all of the symbols are abandoned (step 167). Namely, the symbols in the pack when the command and instruction are the errors are all determined to be invalid.

In addition, the Q flag indicative of no-error (including the case where the 1-symbol error was corrected) is transferred to the P₂-decoder 96 (step 171). The Q flag representing the case where the error of two or more symbols exists is transferred to the P₂-decoder 96 (step 172).

In the P₂-decoder 96, the decoding similar to that by the P-decoder of the first embodiment as shown in FIG. 17B is carried out.

As another embodiment, in the error correcting decoder, the 1-symbol error or 2-symbol error may be corrected only in the case where the error locations obtained lie within 4 to 23 in the P₁-decoder 94 to which 24 symbols in one pack are supplied.

On the other hand, the P₂-decoder 96 may be omitted in the constitution such that the P₁-decoder 94 performs only the detection of the size of error and error location as in the above-mentioned another embodiment or in the constitution such that it corrects the erroneous symbols at the error locations of (4 to 23).

Also, other codes such as adjacent codes or the like may be used as the first and second error correction codes. On one hand, the first codes may be the codes (CRC codes, simple parities) having only the error detecting function. Further, the error correction codes on a bit unit basis such as the BCH codes may be used.

According to the present invention, in the case where the peculiar error detection or error correction coding is performed with respect to the (n+k) symbols among the (n+k+m+l) symbols of which the error correction coding was carried out, a flag indicating the number of erroneous symbols regarding the (n+k) symbols is first generated, this flag is used for the error correction of the (n+k+m+l) symbols at the next stage, or the size of error and error locations are detected with respect to the (n+k+m+l) symbols and the error correction of the (n+k) symbols can be checked using the result of this detection; therefore, the error correcting capability can be improved and it is possible to prevent the wrong error correction. In addition, in case of performing the error correction of the (n+k) symbols, it is possible to detect that this error correction is wrong, so that this makes it possible to raise the error detecting capability with regard to the data having high significant such as the symbols having the information of the operating mode and control content in the subcoding signal of the compact disc.

We claim:

1. An apparatus for correcting errors in data which has, as a unit, (n+k+m+l) symbols subjected to processing for error correction coding when data consisting of n symbols and m symbols having different kinds of information and l parity symbols is transmitted as a unit, said processing consisting of
    an encoding process with respect to a first error detection code or an error correction code for generating a redundancy code of k symbols regarding said n symbols, and
    an encoding process with respect to a second error correction code for generating a redundancy code of one symbol regarding (n+k+m) symbols,
    wherein said error correcting apparatus comprising:
    a first decoder with respect to said first error detection code or said error correction code to which said redundancy code of (n+k) symbols is supplied and which generates a first flag signal indicative of the error state by at least performing the error detection wherein said first flag signal is the signal indicating the number (including 0) of error symbols with respect to the (n+k) symbols; and
    a second decoder with respect to said second error correction code to which (n+k) symbols corrected by said first decoder and (m+l) symbols received are supplied and which generates a second flag signal representing the error state by performing the error detection, wherein said second flag signal is the signal representing the number (including 0) of error symbols before the error correction by said second decoder with respect to the (n+k+m+l) symbols, and performs the error correction by comparing said first and second flag signals and the error correction processing by said second decoder is controlled in accordance with the result of said comparison.

2. An error correcting apparatus according to claim 1, wherein said (n+k+m+l) symbols are the data which is recorded as the subchannel of a disc on which an information signal was recorded as the main channel, and said m symbols are the data for display in the data in said subchannel or the audio data, and n symbols are the control data from said subchannel.

3. An apparatus for correcting errors in data which has, as a unit, (n+k+m+l) symbols subjected to processing for error correction coding when data consisting of n symbols and m symbols having difference kinds of information and l parity symbols is transmitted as a unit, said processing consisting of
    an encoding process with respect to a first error correction code for generating a redundancy code of k symbols regarding said n symbols, and
    an encoding process with respect to a second error correction code for generating a redundancy code of one symbol regarding (n+k+m) symbols,
    wherein said error correcting apparatus comprising:
    a first decoder with respect to said second error correction code to which said (n+k+m+l) symbols are supplied and which generates a first flag signal indicative of the number (including 0) of error symbols and the error locations by performing the error detection regarding the (n+k+m+l) symbols and performs the error correction regarding the (m+l) symbols;
    a second decoder with respect to said first error correction code to which (n+k) symbols transmitted through said first decoder are supplied and which generates a second flag signal representing the number (including 0) of error symbols and performs the error correction suing said first and second flag signals; and
    a third decoder with respect to said second error correction code to which the (n+k+m+l) symbols are supplied from said first and second decoders and which performs the error correction using said second flag signal.

4. An error correcting apparatus according to claim 3, wherein said (n+k+m+l) symbols are the data which is recorded as the subchannel of a disc on which an information signal was recorded as the main channel, and said m symbols are the data for display in the data in said subchannel or the audio data, and said n symbols are the control data for said subchannel.

5. An apparatus for correcting errors in data which has, as a unit, (n+k+m+l) symbols subjected to processing for error correction coding when data consisting of n symbols and m symbols having different kinds of information and l parity symbols is transmitted as a unit, said processing consisting of:
    an encoding process with respect to a first error detection code or an error correction code for generating a redundancy code of k symbols regarding said n symbols, and an encoding process with respect to a second error correction code for generating a redundancy code of one symbol regarding (n+k+m) symbols, wherein said error correcting apparatus comprises:

a first decoder with respect to said first error detection code or said error correction code to which said redundancy code of (n+k) symbols is supplied and which generates a first flag signal indicative of the error state by at least performing the error detection wherein said first flag signal is the signal indicating the number (including 0) of error symbols with respect to the (n+k) symbols; and a second decoder with respect to said second error correction code to which (n+k) symbols corrected by said first decoder and (m+1) symbols received are supplied and which generates a second flag signal representing the error state by performing the error detection, wherein said second flag signal is the signal representing the error locations among the (n+k+m+1) symbols before the error correction by said second decoder, and performs the error correction by comparing said first and second flag signals and the error correction processing by said second decoder is controlled in accordance with the result of said comparison.

* * * * *